United States Patent
Starkweather 4,040,096

Aug. 2, 1977

[54] FLYING SPOT SCANNER WITH RUNOUT CORRECTION

[75] Inventor: Gary K. Starkweather, Saratoga, Calif.

[73] Assignee: Xerox Corporation, Stamford, Conn.

[21] Appl. No.: 626,167

[22] Filed: Oct. 28, 1975

Related U.S. Application Data

[63] Continuation-in-part of Ser. No. 309,874, Nov. 27, 1972, abandoned.

[51] Int. Cl.$^2$ .................... H04N 5/76; H04N 1/04
[52] U.S. Cl. .................... 358/302; 358/293; 358/206; 350/7
[58] Field of Search ............ 178/6.7 R, 6.7 A, 7.6, 178/DIG. 27, DIG. 28; 346/108; 350/6, 7; 356/124, 125, 126, 127, 138; 358/130, 132, 302, 206, 293, 285

[56] References Cited

U.S. PATENT DOCUMENTS

| | | | |
|---|---|---|---|
| 1,406,445 | 2/1922 | Culver | 325/311 |
| 2,258,311 | 10/1941 | Adams | 178/7.1 |
| 2,898,176 | 8/1959 | McNaney | 346/110 |
| 2,976,362 | 3/1961 | Stamps | 178/7.6 |
| 3,005,916 | 10/1961 | Lentze | 250/219 |
| 3,574,469 | 4/1971 | Emerson | 356/200 |
| 3,675,016 | 7/1972 | Blaisdell | 250/236 |
| 3,750,189 | 7/1973 | Fleischer | 350/7 |
| 3,758,187 | 9/1973 | Thomas | 346/108 |
| 3,787,107 | 1/1974 | Sick | 350/7 |

FOREIGN PATENT DOCUMENTS

| | | | |
|---|---|---|---|
| 1,229,309 | 4/1971 | United Kingdom | 179/6.7 R |

OTHER PUBLICATIONS

"Laser Raster Scanner"; by Latta; IBM Tech. Disc. Bulletin; vol. 13, No. 12, May, 1971, pp. 3879-3880.

*Primary Examiner*—Bernard Konick
*Assistant Examiner*—Alan Faber

[57] ABSTRACT

A flying spot scanning system is provided by utilizing reflected light from a multifaceted rotating polygon which is then directed to the scanned medium. A light source illuminates a portion of the mirrored sides of the polygon during each scanning cycle, to provide a desired sequence of spot scanning. In each scanning cycle, information is transmitted to the scanned medium by modulating the light from the light source in accordance with a video signal. An optical convolution of elements is selected in combination with the light source to assure a uniform spot size throughout the scan width on the scanned medium. One of these elements is a cylindrical lens placed in the optical path between the polygon and the scanned medium for allowing a wide variance in runout tolerance of the scanning system.

20 Claims, 5 Drawing Figures

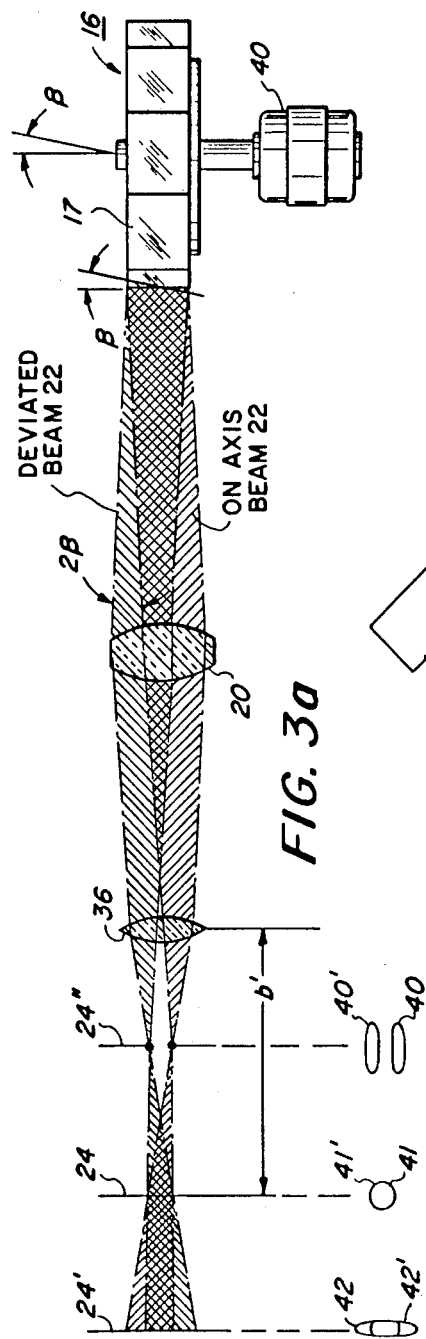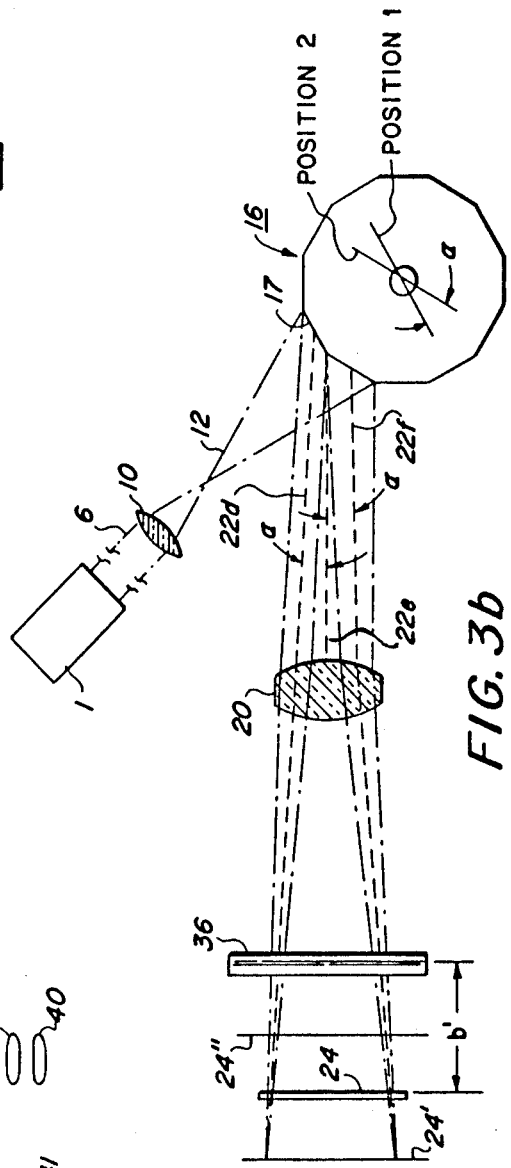

FLYING SPOT SCANNER WITH RUNOUT CORRECTION

RELATED APPLICATIONS

This application is a continuation-in-part application of application Ser. No. 309,874, filed Nov. 27, 1972, now abandoned.

BACKGROUND OF THE INVENTION

This invention relates to a flying spot scanning system for communicating video information to a scanned medium, and more particularly to a scanning system which utilizes a multifaceted rotating polygon for controlling the scanning cycles.

Much attention has been given to various optical approaches in flying spot scanning for the purposes of imparting the information content of a modulated light beam to a scanned medium. Galvanometer arrangements have been used to scan the light across a document for recording its information content thereon. Such arrangements have included planar reflecting mirrors which are driven in an oscillatory fashion. Other approaches have made use of multifaceted mirrors which are driven continuously. Various efforts have been made to define the spot size in order to provide for an optimum utilization of the scanning system.

One such effort is that described in U.S. Pat. No. 3,675,016. The approach used was to make the spot size invariant and as small as possible by defining the dimensions of the focused beam so that only part, preferably half, or a mirror facet is illuminated during scanning. This teaching alludes to generalized techniques for assuring the constancy of the size of the aperture of a rotating mirror scanning system. By either illuminating several facets of the mirror or by directing light in a beam that is sufficiently narrow to assure that less than a full facet is the most than can ever be illuminated by the beam and limiting scanning to that portion of the rotary travel of the facet when such facet is illuminated by all of such light beam. However, such system apertures are dimensionally invariant because the dimensions of the rotating facets have no influence on such apertures.

While the system as described in U.S. Pat. No. 3,675,016 may have advantages over the prior art, nevertheless, various constraints must be imposed upon the spot size and other relationships of optical elements within the system which are not always desirable.

In copending U.S. patent application Ser. No. 309,859, filed on Nov. 27, 1972, now abandoned, and assigned to the assignee of the present invention, a flying spot scanning system is provided which does not have constraints imposed upon the spot size and other relationships of optical elements within the system which are not always desirable. As taught therein, a finite conjugate imaging system may be in convolution with the light beam and the rotating polygon. A doublet lens, in series with a convex imaging lens between the light source and the medium provides such an arrangement.

In this latter arrangement involving an exaggerated spot size, runout and polygon facet errors may be undesirable. It is thus an object of the present invention to provide a flying spot scanning system which may tolerate substantial runout and facet errors.

It is a further object of the present invention to provide a spot scanning system which utilizes a multifaceted rotating polygon for controlling scanning cycles.

It is yet another object of the present invention to provide a spot scanning system which provides an effective uniform spot size at the contact loci of the spot with the scanned medium.

It is still another object of the present invention to provide a spot scanning system which assures an improved sequence of scanning cycles.

It is also an object of the present invention to provide a flying spot scanning system which includes as one of its optical elements a cylindrical lens for compensating runout and polygon facet errors.

It is a further object of the present invention to provide a flying spot scanning system which includes a multifaceted polygon scanner and further includes a cylindrical lens adjacent the scanned medium, the illuminated portion of each facet being focused on said medium in a plane orthogonal to the scan direction.

It is still a further object of the present invention to provide a flying spot scanning system which includes a multifaceted polygon scanner and cylindrical lens adjacent the medium to be scanned, the portion of each facet illuminated by a laser being focused on said medium in a plane orthogonal to the scan direction by the cylindrical lens whereby the position of the spot focused on said medium is not effected by the deflection, or wobble, or the scanner.

Other objects of the invention will be evident from the description hereinafter presented.

SUMMARY OF THE INVENTION

The invention provides a flying spot scanning system which employs a multifaceted rotating polygon as the element for directing a beam of light to focus to a spot upon a medium and for enabling the spot to traverse the medium throughout a scan width. A light source, such as a laser, generates a beam of light substantially orthogonal to the facets of the polygons which illuminated facets in turn reflect the impinging light beam toward the medium in successive scanning cycles. Additional optical elements are provided in convolution with the light source and the polygon to provide a desirable depth of focus of the spot and a sufficient resolution of the optical system.

Another feature of the invention is the inclusion of a cylindrical lens in the optical path between the polygon and the scanned medium. The light beam reflected from the facets of the polygon impinge upon the convex surface of the cylindrical lens to focus at a predetermined position on the surface of the scanned medium regardless of runout and facet errors.

Still another feature of the invention is the modulation of the original light beam by means of a video signal. The information content within the video signal is thereby imparted to the light beam itself. The medium to be scanned is one which is responsive to the modulated beam and records its information content as contained within the scanning spot in a usable form on its surface across the scan width.

Yet another feature of the invention includes an embodiment of the flying spot scanning system for utilization in high speed xerography. The scanned medium in such an embodiment would consist of a xerographic drum which rotates consecutively through a charging station, an exposure station where the spot traverses the scan width of the drum, through a developing station, and a transfer station where a web of copy paper is passed in contact with the drum and receives an electrostatic discharge to induce the transfer of the developed image from the drum to the copy paper. A fusing device then fixes the images to the copy paper as it passes to an output station.

These and other features which are considered to be characteristic of this invention are set forth with particularity in the appended claims. The invention itself, however, as well as additional objects and advantages thereof, will best be understood in the following description when considered in conjunction with the accompanying drawings.

DESCRIPTION OF THE DRAWINGS

FIG. 3a is a beam diagram corresponding to FIG. 2a and illustrates the compensation for scanner tilt provided by the cylindrical lens; and FIG. 3b is a beam diagram corresponding to FIG. 2b.

DESCRIPTION OF THE PREFERRED EMBODIMENT

Figure 1:
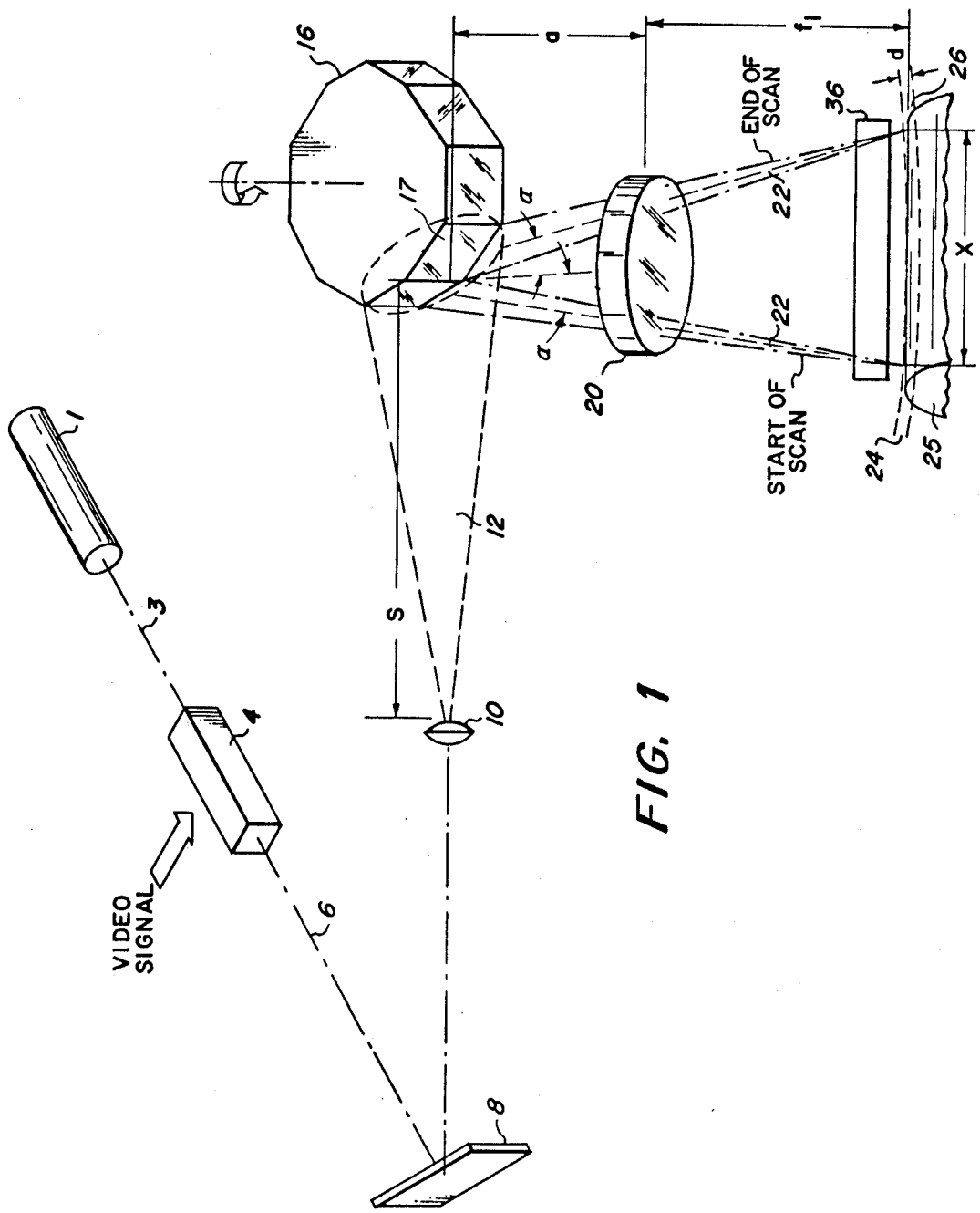
FIG. 1 is an isometric illustrated of a flying spot scanning system in accordance with the invention.

In FIG. 1, an embodiment of a flying spot scanning system in accordance with the invention is shown. A light source 1 provides the original light beam for utilization by the scanning system. The light source 1 is preferably a laser which generates a collimated beam of monochromatic light which may easily be modulated by modulator 4 in conformance with the information contained in a video signal.

Modulator 4 may be any suitable electro-optical modulator for recording the video information in the form of a modulated light beam 6 at the output of the modulator 4. The modulator 4 may be, for example, a Pockel's cell comprising a potassium dihydrogen phosphate crystal, whose index of refraction is periodically varied by the application of the varying voltage which represents the video signal. The video signal may contain information either by means of binary pulse code modulation or wide-band frequency code modulation. In any event, by means of the modulator 4 the information within the video signal is represented by the modulated light beam 6.

The light beam 6 is reflected from mirror 8 in convolution with a doublet lens 10. The lens 10 may be any lens, preferably of two elements, which elements are in spaced relation to each other such that the external curved surfaces are provided in symmetry with the internal surfaces. Preferably the internal surfaces of lens 10 are cemented together to form a common contact zone. Of course, as is often the case in the embodiment of such a lens as a microscope objective, the elements may be fluid spaced. The lens 10 is required to image either a virtual or real axial point of beam 6 through a focal point for example, on the opposite side of lens 10 for a real image. At the focal point, beam 6 diverges or expands to form beam 12 which impinges upon and fully illuminates at least two contiguous facets of a scanning polygon 16.

In the preferred embodiment, the rotational axis of polygon 16 is orthogonal to the plane in which light beams 6 travels. The facets of the polygon 16 are mirrored surfaces for the reflection of any illuminating light impinging upon them. With the rotation of the polygon 16, a pair of light beams are reflected from the respective illuminated facets and turned through a scan angle for flying spot scanning. Alternatively, flying spot scanning could be provided by any other suitable device, such as mirrored piezoelectric crystals or planar reflecting mirrors which are driven in an oscillatory fashion.

In all of these arrangements, however, the mid scan position of the reflecting surfaces such as, for example, reflecting surface 17, would be at a distance S from the originating focal point of light beam 12 and in orthogonal relation to the plane bounded by the beam 6 such that the reflected beams would be in substantially the same plane as beam 6.

At a distance a from the mid scan position of the illuminated facet 17 of polygon 16 is positioned an imaging lens 20. As shown, the lens 20 is located between the polygon 16 and the medium 25. Alternatively, the lens 20 may be located between the polygon 16 and the lens 10 as taught in copending U.S. patent application Ser. No. 309,861, filed on Nov. 27, 1972, now U.S. Pat. No. 3,867,571 and assigned to the assignee of the present invention. In the preferred embodiment, imaging lens 20 is a five element compound lens as disclosed in U.S. patent application Ser. No. 130,134 which was filed on Apr. 1, 1971, now U.S. Pat. No. 3,741,621, and assigned to the assignee of the present invention.

Medium 25 may be a xerographic drum (not shown) which rotates consecutively through a charging station depicted by corona discharge device, an exposure station where the beam from the rotating polygon 16 would traverse a scan width x on the drum, through a developing station depicted by a cascade development enclosure, a transfer station where a web of copy paper is passed in contact with the drum and receives an electrostatic discharge to induce a transfer of the developed image from the drum to the copy paper.

A fusing device fixes the images to the copy paper.

Usable images are provided in that the information content of the scanning spot is represented by the modulated or variant intensity of light respective to its position within the scan width x. As the spot traverses a charged surface, the spot dissipates the electrostatic charge in accordance with its light intensity. The electrostatic charge pattern thus produced would be developed in the developing station and then transferred to the final copy paper. The xerographic drum would be cleaned by some cleaning device such as a rotating brush before being recharged by the charging device. In this manner, the information content of the scanned spot is recorded on a more permanent and useful medium. Of course, alternative prior art techniques may be employed to cooperate with a scanned spot in order to utilize the information contained therein.

As shown in FIG. 2, the polygon 16 is continuously driven by a motor 40 and may be synchronized in rotation to a synchronization signal representation of the scan rate used to obtain the original video signal. In the case of the utilization of a xerographic drum, the rotation rate of the drum determines the spacing of the scan lines. The rotation of the polygon 16 off-axis from that desired causes runout errors or, in this case, a deflection of the beam 22 in the vertical direction away from the desired scan line.

Figure 2A:
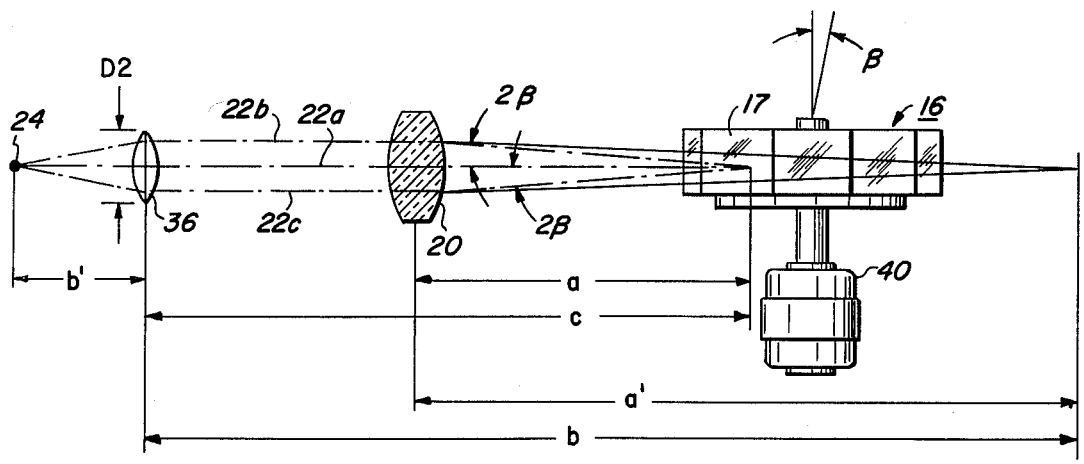
FIG. 2a is a side perspective view of the utilization of the cylindrical correction lens which is an integral part of the flying spot scanning system shown in FIG. 1.

In FIG. 2a, center lines 22a, 22b, 22c of beam 22 are shown with center line 22a being that of an undeviated beam and center lines 22b and 22c being that of beams which have been deviated in opposite vertical directions away from the desired scanning plane. Assuming an angular deviation or tilt of β from the desired axis of rotation for the polygon 16, the position of the scan spot in the vertical direction or direction normal to the direction of scan, i.e., runout error, will be deflected from the desired position by an amount proportional to the angular deviation 2β of the beam. Other misalignments of optical elements within the system, such as facet misalignment, also may cause the same runout effects. For example, if the scanner comprises 24 facets, each having a different alignment, 24 different runout errors may occur.

Since runout errors and polygon facet errors may cause poor results in terms of the quality of image transfer to the scanned medium, a cylindrical lens 36 is positioned in the optical path between the polygon and the scanned medium with its aperture aligned with the aperture of the polygon 16. The lens 36 may be either biconvex, plano-convex or meniscus and, therefore, is a positive cylindrical lens. As shown in FIGS. 1 and 2, the plane of no power of the lens 36 is substantially parallel to the direction of scan or the tangential plane. The disposition of the cylindrical lens 36 in the optical path compensates for such runout effects. The lens 36 is located at a distance $c$ from the origin of the angular deflection 2β and a distance $u$ from the imaging lens 20. The compensation is effected in that the off-axis beam passes through the convex surfaces of lens 36. Then, the lens 36 focuses the facet height, in the sagittal plane, onto a focal plane 24 at a distance $b'$ from the lens 36. Preferably, the cylindrical lens 36 is located at a distance from the surface 26 of the medium 25 approximately equal to the focal length $f_2$ of the lens 36.

Figure 2B:
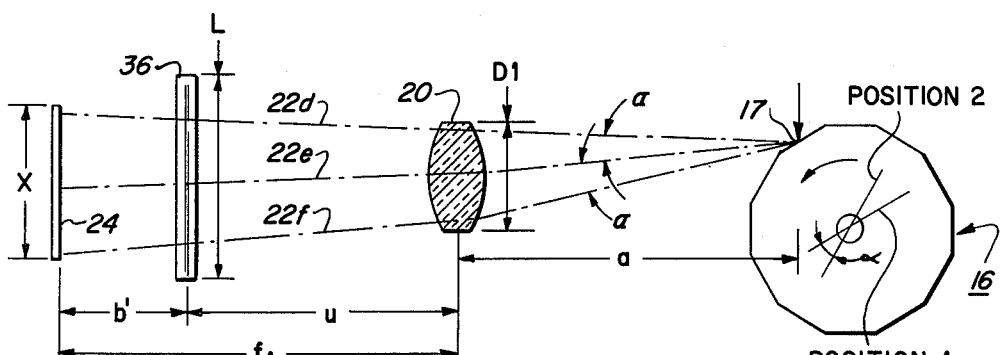
FIG. 2b is a top perspective view of the utilization of the cylindrical lens.

With reference to the optical system, in FIG. 2b, center lines 22d, 22e and 22f of the beam 22 are shown designating start of scan, midscan and end of scan positions, respectively, as the beam 22 is swept across the medium by a facet 17 as the polygon 16 rotates between positions 1 and 2. Referring to FIG. 2a, the lens 20 forms a virtual image of the facet 17 in the sagittal plane a distance $a'$ therefrom. The focal length $f_{20}$ of the lens 20 is defined as $1/f_{20} = (1/a) + (1/a')$. The cylinder lens 36 reimages the virtual image of the facet in the sagittal plane onto the facet focal plane 24 located a distance $b'$ therefrom. The focal length $f_2$ of lens 36 is defined as $1/f_2 = (1/f), + (1/b)$. In this plane 24, the effect of wobble or runout error will be substantially eliminated as the spots reflected by different facets 17 will fall at the same vertical location.

With the above described optical system, minimum scanning spot size and correction for scanner wobble does not necessarily occur at the same image plane. This is readily understood from the following discussion with reference to FIGS. 3a and 3b, which are beam diagrams corresponding to FIGS. 2a and 2b, respectively. Referring to FIG. 3b, the lens 10 in convolution with the imaging lens 20 provides a finite conjugate imaging system in the tangential plane, which focuses the beam 22 as a spot on tangential image focal plane 24'. Referring to FIGS. 3a and 3b, the lenses 10, 20 and 36 act in conjunction with one another to focus the portion of the beam 22 in the sagittal plane onto a plane 24", which is located between the plane 24 and the lens 36. At planes 24", 24 and 24', the scanned spot takes a shape similar to that as illustrated by spots 40, 41 and 42, respectively. The spot 40 is of minimum vertical dimension at its sagittal plane of focus 24", while the vertical dimension of the scanning spot progressively increases in the other planes as shown by successive spots 41 and 42. The spot 42 is of minimum horizontal dimension in its tangential plane of focus 24'. The horizontal dimension of the scanning spot progressively decreases to its minimum size from the other planes as shown by successive spots 40 and 41.

FIG. 3a illustrates in more detail the effect of focusing the facet 17 onto the plane 24 to substantially eliminate wobble or runout errors. Only an on-axis beam and one deviated beam is shown for clarity. The spots 40', 41' and 42' are spots on a deviated beam and correspond to spots 40, 41 and 42 of an on-axis or non-deviated beam. It can be seen that the spots 40 and 40' are separated from each other, spots 42 and 42' overlap each other, while spots 41 and 41' are substantially coincident. Thus, the non-deviated and deviated spots are not vertically aligned in planes 24' and 24", while they are substantially aligned in plane 24. Depending upon the system used, spots 40 and 40' and 42 and 42' may be of different configurations and take different positions relative to each other, but only spots 41 and 41' in the plane 24 will be substantially coincident.

The plane 24 is in a location where the spot is increasing its vertical dimension and decreasing its horizontal dimension. It is desirable that the vertical and horizontal dimensions of the spot be substantially equal for optimum spot size. Therefore, from a practical standpoint, the location of plane 24 may be changed such that its distance from lens 36 varies slightly from the distance $b'$ to find the plane of optimum spot size and minimum wobble, which plane may be referred to as the plane of best focus. Thus, the recording medium 25 is placed in a location where its surface 26 is in the plane of best focus.

In defining the following relationships, for practical purposes, the plane 24 can be considered as coincident with the surface 26. The aperture D1 of the imaging lens 20 is equal to approximately $2ax/f_1$, wherein $f_1$ is the distance the lens 20 is located from the plane 24 and $x$ is the scan width of the medium 25. The f/number of the lens 20 is equal to approximately $x/2a \tan^2\alpha$.

The minimum aperture of lens 36 which may be utilized to practice the invention is given by the following relationship:

$$D_2 \cong 2b \tan \beta$$

However, a constant aperture size for lens 36 of, for example, approximately one-half inch is sufficient for most applications.

Having defined $f_2$ and assuming a constant value for $D_2$, it is helpful to determine the minimum necessary (f/number)$_2$ for the lens 36:

$$(f/\text{number})_2 = f_2/D_2 = b'/2 \tan\beta \, (b' + b)$$

The number of facets in this preferred embodiment has been found to be optimum if at least 20 to 30 facets are employed. The scan angle $\alpha$ traversed would be equal to the number of facets chosen in relation to one complete revolution of the polygon 16. An extremely useful arrangement would have the polygon 16 with 24 facets and a scan angle $\alpha$ of 15°. A depth of focus requirement $d$ of the converging beam 22 is related to the scan angle $\alpha$ in that as the scan angle $\alpha$ increases the radius of curvature of the focal plane 24 increases, it is important to define a scan angle $\alpha$ in relation to the desired scan width $x$. For a scan width $x$ of approximately 11 inches it has been found that the scan angle $\alpha$ of 12° to 18°, with 20 to 30 facets on the polygon 16, is optimum. To insure that lens 36 is sufficiently wide, a length L thereof is provided approximately equal to or greater than the scan width $x$.

The optical system of the present invention provides a virtually 100% duty cycle scan for the entire scan angle $\alpha$ by virtue of the illumination of at least two contiguous facets. The illumination of two contiguous facets is preferred. With such illumination, another scanning spot is provided at a distance equal to the scan width $x$ behind the leading scanning spot with virtually no wait between successive scans. With the continuous rotation of the polygon 16 additional contiguous facets are subsequently illuminated, thereby providing successive convergent beams following the leading convergent beam 22 by no more than the scan angle, if so desired. Thus, a flying spot scanning system which has an extremely high duty cycle is provided.

Illumination of the full facet also has the advantage of minimizing any nicks or scratches, which may be on the facet surface. For instance, if a nick or scratch occupies $y\%$ of the facet surface, the nick or scratch will show up as $y\%$ of the spot reflected by the facet. However, as long as the nick or scratch remains within the area of illumination of the facet and such area decreases, the nick or scratch will show up as a greater proportion of the spot than $y\%$. When a beam is focused in the sagittal plane on the facet and a nick or scratch is in the illuminated portion, the percentage of the spot reflected by such facet that is occupied by the nick or scratch can be very substantial, which will show up in a resulting developed image.

Obviously, many modifications of the present invention are possible in light of the above teaching. It is therefore to be understood that, in the scope of the appended claims, the invention may be practiced other than as specifically described.

What is claimed is:

1. A flying spot scanning system comprising:
   means for generating a beam of high intensity light,
   a medium,
   optical means for imaging said beam to a spot at the surface of said medium at a predetermined distance from said optical means,
   a multifaceted polygon located in the path of said imaged beam between said beam generating means and said medium and having reflective facets for reflecting the beam incident to it onto said medium,
   means for rotating said polygon such that the reflected light is scanned in successive traces across said medium, and
   said optical means including a positive cylindrical lens positioned in the optical path of the beam between said polygon and said medium at a location such that runout errors are substantially corrected at said medium, the plane of no power of said cylindrical lens being oriented in the direction of the scan.

2. The structure as recited in claim 1:
   said beam generating means being a laser,
   means located between said laser and polygon for modulating the light beam in accordance with information content of electrical signals, and
   said medium being light sensitive.

3. The structure as recited in claim 1, wherein said facets are focused in the sagittal plane onto the surface of said medium.

4. The structure as recited in claim 3, wherein an intermediate focal point of the beam in the sagittal plane is at a location other than said facets.

5. The structure as recited in claim 4, wherein optimum spot size is provided at the surface of said medium.

6. The structure as recited in claim 1, wherein said cylindrical lens has a minimum focal number ($f$/number)$_2 \cong b'/[2 \tan\beta (b' + b)]$, where $b$ is the object distance of the origin of runout error as seen by said lens, $b'$ is the distance of said lens from said medium surface, and $\beta$ is the angular measure of runout error.

7. The structure as recited in claim 6:
   said beam generating means being a laser,
   means located between said laser and polygon for modulating the light beam in accordance with information content of electrical signals, and said medium being light sensitive.

8. The structure as recited in claim 6, wherein said facets are focused in the sagittal plane onto the surface of said medium.

9. The structure as recited in claim 8, wherein an intermediate focal point of the beam in the sagittal plane is at a location other than said facets.

10. The structure as recited in claim 9, wherein optimum spot size is provided at the surface of said medium.

11. A flying spot scanning system comprising:
    means for generating a beam of high intensity light,
    a medium,
    first optical means for expanding said beam,
    second optical means in convolution with said first optical means, said first and second optical means defining a finite conjugate imaging system for imaging said expanded beam to a spot on the surface of said medium at a predetermined distance from said second optical means,
    a multifaceted polygon having reflective facets positioned in the optical path of said expanded beam to reflect said beam toward said medium,
    means for rotating said polygon such that said reflected beam is scanned through a scan angle to provide successive spot scanning traces across said medium,
    said second optical means including a positive cylindrical lens in the optical path of the beam so positioned between said polygon and said medium that runout errors are substantially corrected at said medium, the plane of no power of said cylindrical lens being oriented in the direction of scan.

12. The structure as recited in claim 11:
    said beam generating means being a laser,
    means located between said laser and polygon for modulating the light beam in accordance with information content of electrical signals, and
    said medium being light sensitive.

13. The structure as recited in claim 11, wherein said facets are focused in the sagittal plane onto the surface of said medium.

14. The structure as recited in claim 13, wherein an intermediate focal point of the beam in the sagittal plane is at a location other than said facets.

15. The structure as recited in claim 14, wherein optimum spot size is provided at the surface of said medium.

16. The structure as defined in claim 11, wherein said cylindrical lens has a minimum focal number ($f$/number)$_2 \cong b'/[2 \tan \beta (b' + b)]$, where $b$ is the object distance of the origin of runout error as seen by said lens, $b'$ is the distance of said lens from said medium surface, and $\beta$ is the angular measure of runout error.

17. The structure as recited in claim 11,
said beam generating means being a laser
means located between said laser and polygon modulating the light beam in accordance with information content of electrical signals, and
said medium being light sensitive.

18. The structure as recited in claim 6, wherein said facets are focused in the sagittal plane onto the surface of said medium.

19. The structure as recited in claim 18, wherein an intermediate focal point of the beam in the sagittal plane is at a location other than said facets.

20. The structure as recited in claim 19, wherein optimum spot size is provided at the surface of said medium.

* * * * *